United States Patent
Devoe

(10) Patent No.: US 10,326,235 B2
(45) Date of Patent: Jun. 18, 2019

(54) ELECTROMAGNETIC CONNECTIONS FOR DYNAMICALLY MATING AND UN-MATING A WIRED HEAD-MOUNTED DISPLAY

(71) Applicant: Facebook Technologies, LLC, Menlo Park, CA (US)

(72) Inventor: Matthew James Devoe, Menlo Park, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 10 days.

(21) Appl. No.: 15/490,792

(22) Filed: Apr. 18, 2017

(65) Prior Publication Data

US 2018/0301845 A1  Oct. 18, 2018

(51) Int. Cl.
| | |
|---|---|
| H01R 13/24 | (2006.01) |
| B30B 1/42 | (2006.01) |
| H01R 43/04 | (2006.01) |
| H01R 13/62 | (2006.01) |
| G06F 1/16 | (2006.01) |

(52) U.S. Cl.
CPC ......... *H01R 13/6205* (2013.01); *G06F 1/163* (2013.01); *G06F 1/1683* (2013.01)

(58) Field of Classification Search
CPC ...... G02B 2027/014; G02B 2027/0138; G02B 27/017; G02B 27/0172; G02B 2027/0187; G02B 27/0093; H01R 13/6205; H01R 13/629

See application file for complete search history.

(56) References Cited

U.S. PATENT DOCUMENTS

| | | | | |
|---|---|---|---|---|
| 3,783,662 | A * | 1/1974 | Keller | B30B 1/42 72/1 |
| 6,030,229 | A * | 2/2000 | Tsutsui | H01R 13/6205 336/90 |
| 7,354,315 | B2 * | 4/2008 | Goetz | H01R 13/2428 439/638 |
| 7,517,222 | B2 * | 4/2009 | Rohrbach | H01R 13/6205 439/39 |
| 8,938,301 | B2 * | 1/2015 | Hagedorn | A61B 5/0478 607/45 |
| 2017/0168303 | A1 * | 6/2017 | Petrov | G02C 11/08 |
| 2017/0178565 | A1 * | 6/2017 | Fujimaki | G09G 3/2003 |
| 2017/0308157 | A1 * | 10/2017 | Tsuda | H04W 4/80 |
| 2017/0325039 | A1 * | 11/2017 | Khwaja | G08B 6/00 |

* cited by examiner

*Primary Examiner* — Amy Cohen Johnson
*Assistant Examiner* — Matthew T Dzierzynski
(74) *Attorney, Agent, or Firm* — Morgan, Lewis & Bockius LLP

(57) ABSTRACT

An apparatus for electrically connecting electronic devices includes a first connector including an electromagnet. The apparatus also includes a second connector that includes a magnetic element and is detachably coupleable to the first connector. The electromagnet is energizeable to selectively couple and decouple the first and second connectors. The apparatus further includes a force transducer coupleable to the electromagnet to measure a coupling force between the first and second connector and transmit a signal based on the coupling force, and a controller coupleable to the force transducer to receive the signal from the force transducer. The controller is coupleable to a power source to control the electromagnet.

18 Claims, 4 Drawing Sheets

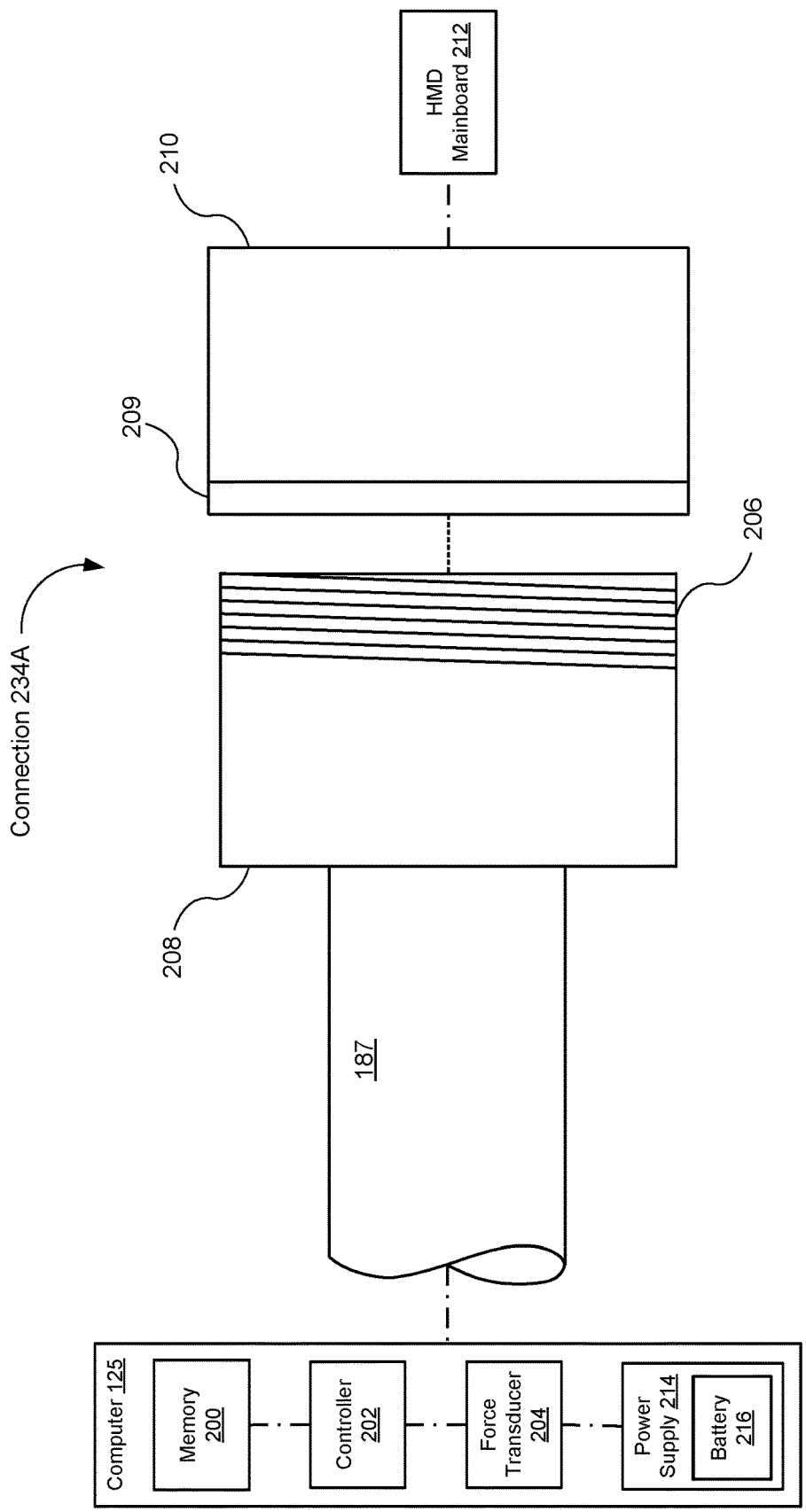

ELECTROMAGNETIC CONNECTIONS FOR DYNAMICALLY MATING AND UN-MATING A WIRED HEAD-MOUNTED DISPLAY

TECHNICAL FIELD

This application relates generally to wearable technology and virtual-reality technology, including but not limited to a head-mounted display, a computer (e.g., personal computer, mobile phone), and a cable including an electromagnetic connection for dynamically mating and un-mating to connect the head-mounted display to the computer.

BACKGROUND

Virtual-reality (VR) head-mounted displays (HMDs) have wide applications in various fields, including engineering design, medical surgery practice, military simulated practice, and video gaming. Virtual-reality systems require a volume of data communication between the HMD and the computer. Historically, cables are the preferred agent in such systems for conveying the high volume of data.

Cables restrict the user from full movement freedom. Furthermore, virtual-reality systems may lack the ability to quickly disconnect the head mounted display from the computer without causing damage to the systems.

SUMMARY

Accordingly, there is a need for a cable capable of dynamic mating and un-mating for virtual-reality systems (e.g., when the cable is pulled taught). Users of virtual-reality systems often become engrossed in their virtual reality and do not recognize boundaries set by physical limitations such as the length of the cable connecting the HMD to the computer. The apparatuses and methods discloses herein address this need.

In accordance with some embodiments, an apparatus for electrically connecting electronic devices includes a first connector including an electromagnet. The apparatus also includes a second connector that includes a magnetic element and is detachably coupleable to the first connector. The electromagnet is energizeable to selectively couple and decouple the first and second connectors. The apparatus further includes a force transducer coupleable to the electromagnet to measure a coupling force between the first and second connectors and transmit a signal based on the coupling force, and a controller coupleable to the force transducer to receive the signal from the force transducer. The controller is coupleable to a power source to control the electromagnet.

In accordance with some embodiments, a method of dynamically adjusting the coupling force of two connectors of an apparatus for electrically connecting electronic devices includes providing a first connector of the two connectors with an electromagnet. The method further comprises coupling the electromagnet to a force transducer; providing the second connector of the two connectors with a magnetic element; and supplying, by a power supply, a current to the electromagnet to energize the electromagnet and selectively couple or decouple the electromagnet with a magnetic element. The method further comprises determining, by the force transducer, a coupling force between the first and second connectors due to coupling of the electromagnet with the magnetic element and transmitting, by the force transducer, a signal associated with the coupling force between the first and second connectors. The method further comprises receiving, by a controller, the signal associated with the coupling force and controlling, by the controller, the current supplied to the electromagnet to adjust the coupling force based on the signal received from the force transducer.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

FIG. 2A is an enlarged view of an electromagnetic connection for dynamic mating and un-mating in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first connector could be termed a second connector, and, similarly, a second connector could be termed a first connector, without departing from the scope of the various described embodiments. The first connector and the second connector are both connectors, but they are not the same connectors.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
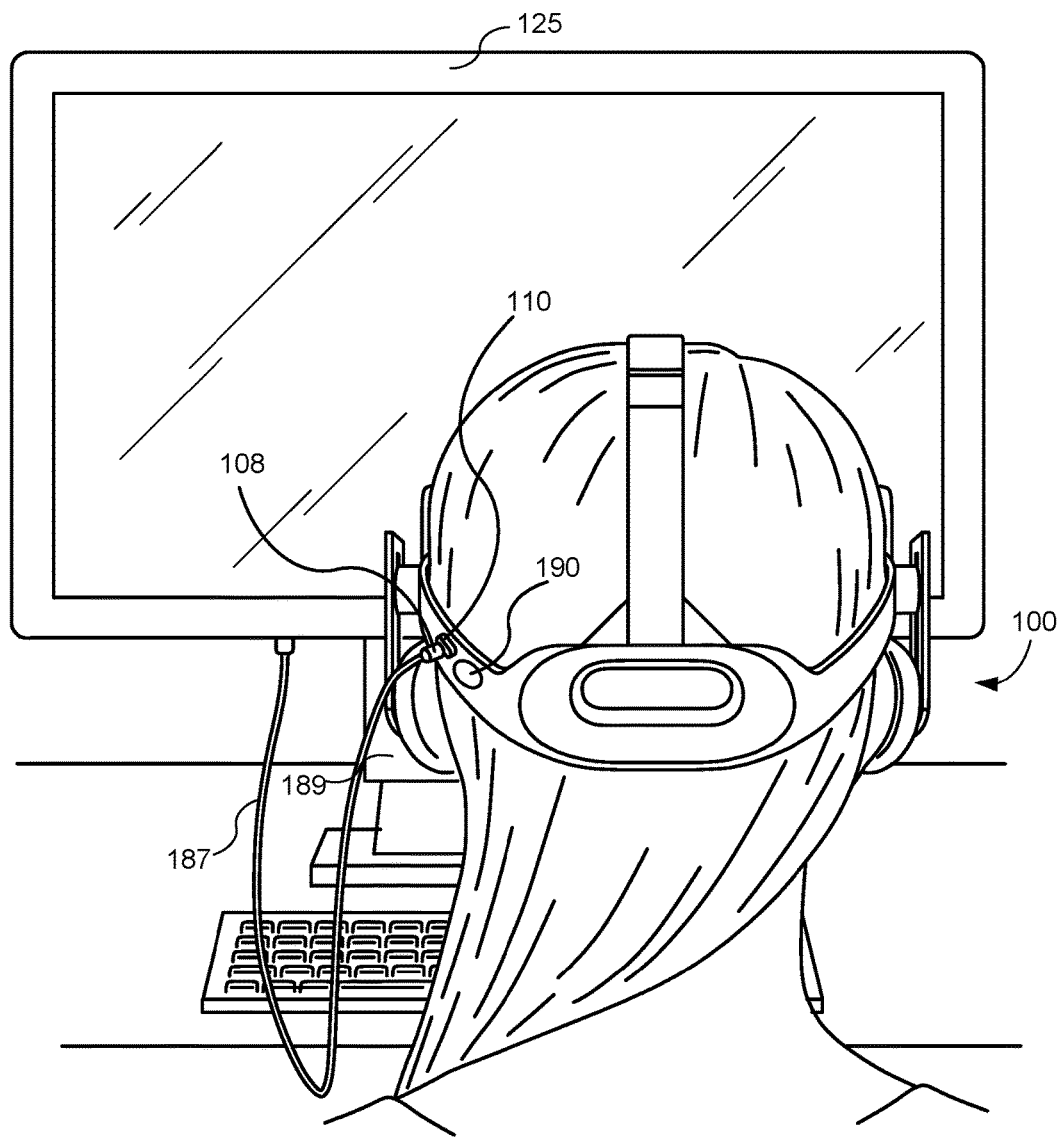
FIG. 1 is a view of a VR system that includes a computer, a head-mounted display (HMD), and an electromagnetic connection for dynamically mating and un-mating a connection between the computer and the HMD in accordance with some embodiments.

FIG. 1 is a view of a Virtual Reality (VR) system that includes an HMD 100, computer 125, and electromagnetic connection with a first connector 108 and a second connector 110. The first connector 108 and second connector 110 dynamically mate and un-mate to communicatively couple the HMD 100 to the computer 125 through a cable 187. The first connector 108 is situated at an end of the cable 187. The computer 125 (e.g., desktop computer, laptop, cell phone, PDA, tablet) is shown as a desktop computer and the cable 187 is shown as being connected to the monitor of the desktop computer; however, the cable 187 may also be connected to an enclosure (e.g., the processing tower 189 (CPU tower)) of the computer 125. In some embodiments, a key (e.g., button, switch, etc.) 190 is disposed on the HMD.

The cable 187 includes an apparatus for electrically connecting an electronic device (e.g., HMD 100) to an electrical relation (e.g., computer 125). The apparatus for electrically connecting electronic devices (e.g., a head mounted display to a computer) includes the first connector 108, which includes a first magnetic element, and a second connector 110, which includes a second magnetic element detachably coupleable to the first magnetic element. At least one of the first magnetic element and the second magnetic element is energizeable (e.g., is an electromagnet) to selectively couple and decouple the first and second connectors 108 and 110.

In some embodiments, a VR system does not include a computer separate from the HMD 100. For example, the HMD 100 may include processing circuitry for virtual-reality processing, such that no separate computer is used. In such embodiments, the cable 187 may be used to provide power to the HMD 100.

FIG. 2A is an enlarged view of an electromagnetic connection for dynamic mating and un-mating in accordance with some embodiments. An electromagnetic connection 234A includes a first connector 208 and a second connector 210. The first connector 208 and second connector 210 are respective examples of the first connector 108 and second connector 110 (FIG. 1). The first connector 208 includes an electromagnet 206. The second connector 210 includes a magnetic element 209 and is detachably coupleable to the first connector 208: the magnetic element 209 is detachably coupleable to the electromagnet 206. The first connector 208 is coupleable to computer 125. Computer 125 includes memory 200, controller 202, force transducer 204, and power supply 214 (i.e., a power source). The power supply 214 may include a battery 216 or may receive power from AC mains. The controller 202 is coupleable to the force transducer 204 to receive the signal from the force transducer. The controller 202 is coupleable to the power supply 214 to control the electromagnet 206. The second connector 210 is coupleable to the HMD mainboard 212.

Figure 2B:
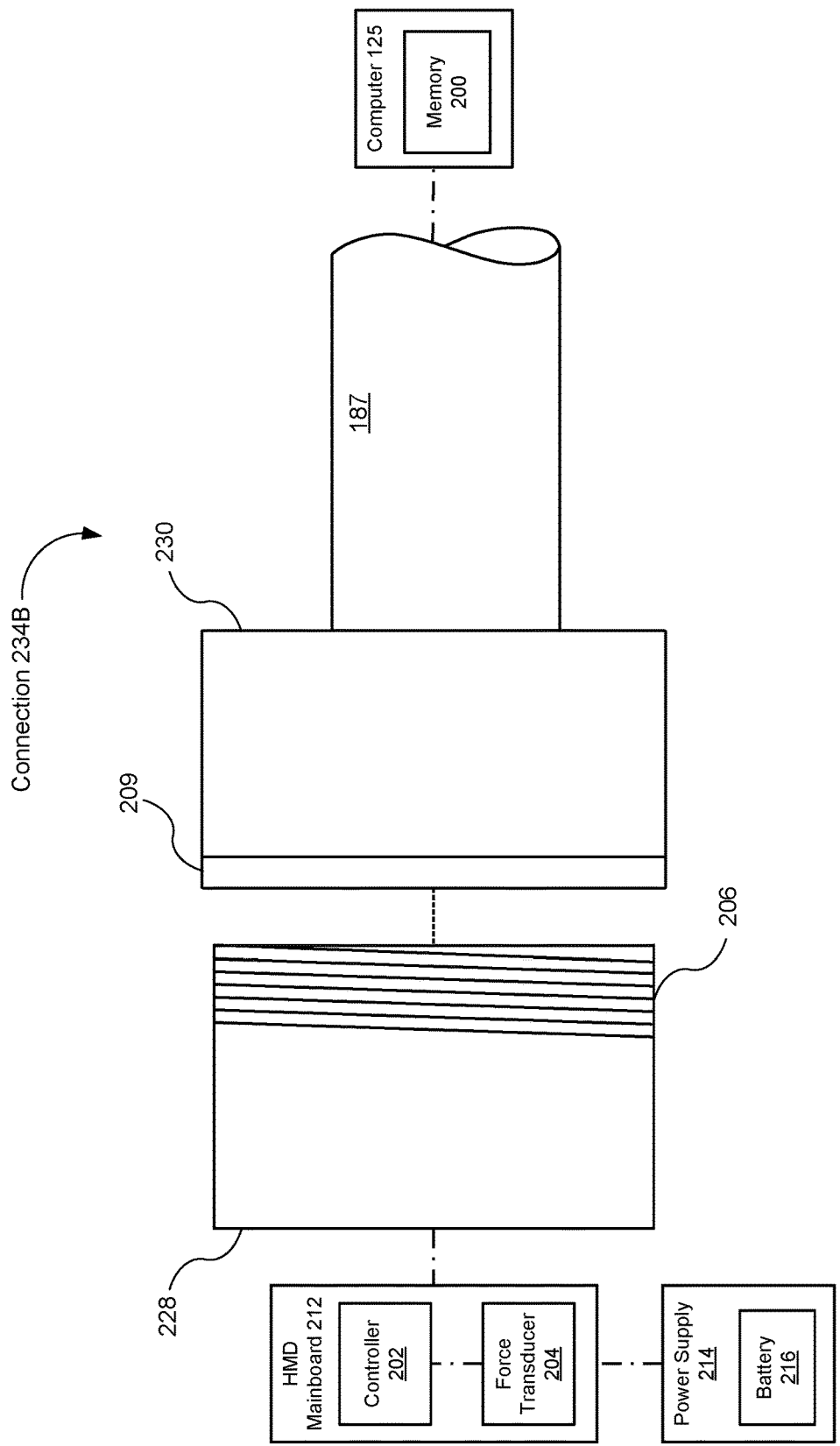
FIG. 2B is another enlarged view of an electromagnetic connection for dynamic mating and un-mating in accordance with some embodiments.

FIG. 2B is another enlarged view of an electromagnetic connection for dynamic mating and un-mating in accordance with some embodiments. An electromagnetic connection 234B includes a first connector 228 and a second connector 230. The first connector 228 and second connector 230 are respective examples of the second connector 110 and first connector 108 (FIG. 1). The first connector 228 includes an electromagnet 206. The second connector 230 includes a magnetic element 209 and is detachably coupleable to the first connector 228: the magnetic element 229 is detachably coupleable to the electromagnet 206. The electromagnet 206 is energizeable to selectively couple or decouple the first connector 228 and second connector 230. The first connector 228 is coupleable to the HMD mainboard 212. The HMD mainboard 212 includes a controller 202 (e.g., one or more processors) and force transducer 204. The HMD mainboard 212 and electromagnet 206 are coupleable to a power supply 214 including a battery 216. The first connector 230 is coupleable to the computer 125. The computer 125 includes memory 200.

Memory 200 includes high-speed random-access memory, such as DRAM, SRAM, DDR RAM, or other random-access solid-state memory devices, and may include non-volatile memory, such as one or more magnetic disk storage devices, optical disk storage devices, flash memory devices, and/or other non-volatile solid-state storage devices. Memory 200 includes a non-transitory computer-readable storage medium.

The electromagnet 206 is energizeable to selectively couple and decouple the first and second connectors 208/228 and 210/230. A force transducer 204 is coupleable to the electromagnet 206 to measure a coupling force between the first connector 108 and second connector 110 and transmit a signal based on the coupling force. A controller 202 (e.g., a microcontroller or other processor) is coupleable to the force transducer 204 to receive the signal from the force transducer 204 and is coupleable to the electromagnet 206 to control the electromagnet 206. While the force transducer 204, controller 202, and power supply 214 are shown as being on the same side of the connection 234A/234B as the first connector 208, the force transducer 204, controller 202, and/or power supply 214 may alternatively be on the opposite side of the connection 234A/234B from the first connector 208. In some embodiments, the force transducer is separate from the computer 125 and/or HMD 100 (e.g., is situated in one of the connectors, such as the connector that includes the electromagnet) and the signal is transmitted through the cable 187 to the computer 125 or HMD 100.

In some embodiments, the first connector 208/228 includes a first magnet (e.g., electromagnet 206) and the second connector 210/230 includes a second magnet (e.g., magnetic element 209 is a magnet) detachably coupleable to the first magnet. At least one of the first magnet and second magnet (e.g., electromagnet 206) is energizeable to selectively couple and decouple the first and second connectors 208 and 210. A force transducer 204 is coupleable to at least one of the first and second magnets to measure a coupling force between the first and second connectors 208/228 and 210/230 and transmit a signal based on the coupling force. A power source (e.g., power supply 214) supplies a current to the at least one of the first and second magnets that is energizeable. A controller 202 is coupleable to the force transducer 204 to receive the signal from the force transducer 204 and is coupleable to the power source to dynamically control the current supplied by the power source.

In some embodiments, the second connector 210 is coupled to the HMD mainboard 212 (FIG. 2A).

In some embodiments, the magnetic element 209 is an electromagnet, a permanent magnet, or a ferromagnetic material. In some embodiments, the first connector 208 and second connector 209 include respective permanent magnets, and the first connector 208 also includes the electromagnet 206, which may be energized to cancel the magnet field and un-mate the first connector 208 from the second connector 209.

In some embodiments, the electromagnet 206 comprises a core with a ferromagnetic material and an electrically conductive coil wrapped around the core and coupleable to a power source (e.g., power supply 214, FIGS. 2A-2B). The power source supplies a current to energize the electromagnet 206. When energized, the electromagnet 206 will connect to (i.e., mate with) the magnetic element 209 if it is in sufficient proximity to the magnetic element 209. When de-energized, the electromagnet will disconnect from (i.e., un-mate with) the magnetic element 209. The coupling force between the electromagnet 206 and magnetic element 209 is a function of the current supplied by the power source, with higher current resulting in a higher coupling force, and vice-versa.

In some embodiments, the second connector 110 (FIG. 1) (e.g., second connector 210, FIG. 2A; first connector 228, FIG. 2B) is disposed on a housing of a headset 100 of the virtual-reality (VR) system and the first connector 108 (e.g., first connector 208, FIG. 2A; second connector 230, FIG. 2B) is communicatively coupleable to a computer 125 through a cable 187 adapted to transmit data (e.g., video, audio, and/or other data) from the computer 125. The headset 100 is communicatively coupleable to the computer 125 to receive the data from the computer 125 when the cable 187 is plugged into the computer 125 and the electromagnet 206 is energized and thereby coupled to the magnetic element 209. The second connector 110 is electrically coupleable to the headset 100 (e.g., to the HMD mainboard 212). The controller 202 controls supply of the current from the power source (e.g., power supply 214) to the electromagnet 206 to selectively energize the electromagnet 206 and dynamically adjust the coupling force between the first connector 108 and the second connector 110 based on the signal received from the force transducer 204.

In some embodiments, the electromagnet 206 is coupleable to a power source (e.g., power supply 214, which may include battery 216 or may receive power from AC mains, FIG. 2B) disposed in the housing of the headset. (Alternatively, the electromagnet 206 may couple to a power source through the connection. For example, power is supplied to the electromagnet 206 through the cable 187.) The battery supplies a current to energize the electromagnet 206. In some embodiments, the headset 100 comprises a user input key 190 (FIG. 1) communicatively coupleable to the controller 202, which adjusts (e.g., increases) the supply of current from the battery to the electromagnet 206 when activated (e.g., pressed). For example, an increase in current supply increases the coupling force between the first and second connectors 108 and 110 based on a user input to the user input key 190.

In some embodiments, the controller 202 terminates the supply of current to the electromagnet 206 to decouple the first and second connectors 108 and 110 based on a user input to the user input key 190. For example, a user wearing the HMD 100 can press a button to terminate the current supply to the second connector 110 (or alternately the first connector 108) to decouple the HMD 100 from the computer 125.

In some embodiments, the controller 202 controls supply of the current from the power source (e.g., power supply 214) to the electromagnet 206 to selectively energize the electromagnet 206 and dynamically adjust the coupling force between the first connector 108 and the second connector 110 based on the signal received from the force transducer 204.

In some embodiments, the controller 202 reduces the supply of current to the electromagnet 206 to decrease the coupling force between the first connector 108 and the second connector 110 when the signal received from the force transducer indicates that the coupling force is reduced. The coupling force may be initially reduced, for example, by a user attempting to pull apart the connectors 108 and 110. In response, the controller 202 instructs the power supply 214 to reduce the supply of current to the electromagnet 206, thus making it easier for the user to pull apart the connectors 108 and 110.

In some embodiments, the controller 202 terminates the supply of current to the electromagnet 206 to decouple the first connector 108 and the second connector 110 when the signal received from the force transducer 204 indicates that the coupling force is below a predetermined threshold. For example, if the user pulls on the connectors 108 and 110 with sufficient force to reduce the coupling force below the predetermined threshold, the controller 202 instructs the power supply 214 to stop the supply of current to the electromagnet 206, thus de-energizing the electromagnet 206 and decoupling the connectors 108 and 110.

Instructions for operation of the controller 202 may be stored in memory (e.g., a non-transitory computer-readable storage medium), such as the memory 200 or a non-volatile memory embedded in the controller 202 or located on the HMD mainboard 212.

Figure 3:
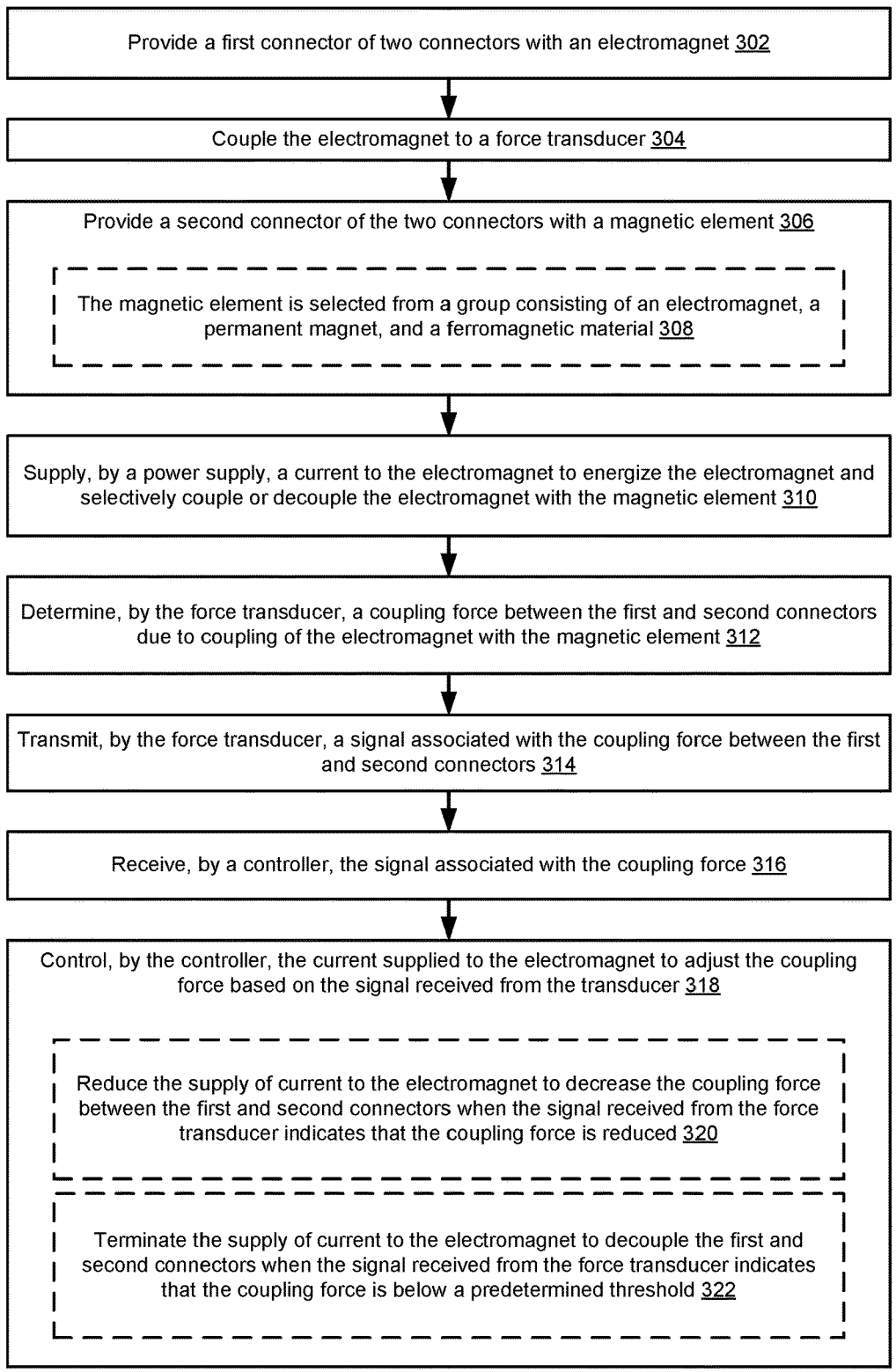
FIG. 3 is a flow diagram illustrating a method of dynamically mating and un-mating an electromagnetic connection in accordance with some embodiments.

FIG. 3 is a flow diagram illustrating a method 300, which dynamically adjusts the coupling force of two connectors (e.g., connectors 108 and 110, FIG. 1, such as connectors 208 and 210, FIG. 2A, or connectors 228 and 230, FIG. 2B) of an apparatus for electrically connecting an electronic device (e.g., HMD 100) to an electrical relation (e.g., computer 125), in accordance with some embodiments.

The method 300 includes providing 302 a first connector of two connectors with an electromagnet (e.g., electromagnet 206) and coupling 304 the electromagnet to a force transducer (e.g., force transducer 204). The method further includes providing 306 a second connector of the two connectors with a magnetic element (e.g., magnetic element 209). In some embodiments, the magnetic element is selected 308 from the group consisting of an electromagnet, a permanent magnet, and a ferromagnetic material.

A power supply (e.g., power supply 214), which may also be referred to as a power source, supplies 310 a current to the electromagnet to energize the electromagnet and to selectively couple or decouple the electromagnet with the magnetic element.

The force transducer determines 312 a coupling force between the first and second connectors due to coupling of the electromagnet with the magnetic element. The force transducer transmits 314 a signal associated with the coupling force between the first and second connectors.

A controller (e.g., controller 202) receives 316 the signal associated with the coupling force and controls 318 the current supplied to the electromagnet to adjust the coupling force based on the signal received from the transducer.

In some embodiments, when the signal received from the force transducer indicates that the coupling force is reduced, the supply of current to the electromagnet is reduced 320 to decrease the coupling force between the first and second connectors. In some embodiments, when the signal received from the force transducer indicates that the coupling force is below a predetermined threshold, the supply of current to the electromagnet is terminated 322 to decouple the first and second connectors.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An apparatus for electrically connecting electronic devices, comprising:
   a first connector including an electromagnet;
   a second connector, which includes a magnetic element and is detachably coupleable to the first connector, wherein the electromagnet of the first connector is energizeable to selectively couple or decouple the first and second connectors;
   a force transducer coupleable to the electromagnet to measure a coupling force between the first and second connectors and transmit a signal based on the coupling force; and
   a controller coupleable to the force transducer to:
      receive the signal from the force transducer; and
      control supply of current from a power source to the electromagnet, wherein the controller reduces the supply of current to the electromagnet when the signal indicates the coupling force is below a predetermined threshold.

2. The apparatus of claim 1, wherein the magnetic element of the second connector is selected from the group consisting of an electromagnet, a permanent magnet, and a ferromagnetic material.

3. The apparatus of claim 1, wherein the electromagnet comprises:
   a core comprising a ferromagnetic material; and
   an electrically conductive coil coupleable to the power source, the power source to supply a current to energize the electromagnet.

4. The apparatus of claim 1, wherein:
   the first connector is disposed on and electrically coupled to a housing of a headset of a virtual-reality system;
   the second connector is communicatively coupleable to a computer through a cable adapted to transmit data from the computer; and
   the headset is communicatively coupleable to the computer to receive the data when the electromagnet is energized.

5. The apparatus of claim 4, wherein the power source is to receive power from AC mains.

6. The apparatus of claim 4, wherein the power source comprises a battery disposed in the housing of the headset, the battery to supply a current to energize the electromagnet.

7. The apparatus of claim 4, wherein:
   the headset further comprises a user-input key communicatively coupleable to the controller; and
   the controller is to increase the supply of current to the electromagnet to increase the coupling force between the first and second connectors based on a user input to the user-input key.

8. The apparatus of claim 7, wherein the controller is adapted to terminate the supply of current to the electromagnet to decouple the first and second connectors based on a user input to the user-input key.

9. The apparatus of claim 7, wherein:
   the first connector is disposed on and electrically coupled to a housing of a headset of the virtual-reality system;
   the second connector is communicatively coupleable to a computer through a cable adapted to transmit data from the computer; and
   the headset is communicatively coupleable to the computer to receive the data when the electromagnet is energized.

10. The apparatus of claim 7, wherein:
   the first connector is communicatively coupleable to a computer through a cable adapted to transmit data from the computer;
   the second connector is disposed on and electrically coupled to a housing of a headset of the virtual-reality system; and
   the headset is communicatively coupleable to the computer to receive the data when the electromagnet is energized.

11. The apparatus of claim 1, wherein:
   the first connector is communicatively coupleable to a computer through a cable adapted to transmit data from the computer;
   the second connector is disposed on and electrically coupled to a housing of a headset of a virtual-reality system; and
   the headset is communicatively coupleable to the computer to receive the data when the electromagnet is energized.

12. The apparatus of claim 1, wherein the controller is adapted to dynamically adjust the coupling force between the first connector and the second connector based on the signal received from the transducer.

13. The apparatus of claim 1, wherein the controller is adapted to terminate the supply of current to the electromagnet to decouple the first and second connectors when the signal received from the force transducer indicates that the coupling force is below the predetermined threshold.

14. An apparatus for electrically connecting electronic devices, comprising:
   a first connector including a first magnet;
   a second connector, which includes a second magnet and is detachably coupleable to the first magnet, wherein at least one of the first magnet and the second magnet is an electromagnet that is energizeable to selectively couple and decouple the first and second connectors;
   a force transducer coupleable to at least one of the first and second magnets to measure a coupling force between the first and second connectors and transmit a signal based on the coupling force;
   a power source to supply a current to the at least one of the first and second magnets that is energizeable; and
   a controller coupleable to the force transducer to:
      receive the signal from the force transducer; and
      control supply of current from a power source to the electromagnet, wherein the controller reduces the supply of current to the electromagnet when the signal indicates the coupling force is below a predetermined threshold.

15. The apparatus of claim 14, wherein the electromagnet comprises:
   a core comprising a ferromagnetic material; and
   an electrically conductive coil coupleable to a power source, the power source to supply a current to energize the electromagnet.

16. A method of dynamically adjusting a coupling force of two connectors, the method comprising:
   providing a first connector with an electromagnet, wherein the electromagnet is energizeable to selectively couple or decouple the first connector and a second connector;
   coupling the electromagnet to a force transducer;
   providing the second connector with a magnetic element that is detachably coupleable to the first connector;

supplying, by a power supply, a current to the electromagnet to energize the electromagnet and selectively couple or decouple the electromagnet with the magnetic element;

determining, by the force transducer, a coupling force between the first and second connectors due to coupling of the electromagnet with the magnetic element;

transmitting, by the force transducer, a signal associated with the coupling force between the first and second connectors;

receiving, by a controller, the signal associated with the coupling force; and controlling, by the controller, the current supplied from a power source to the electromagnet to reduce the supply of current to the electromagnet when the signal indicates the coupling force is below a predetermined threshold.

17. The method of claim 16, wherein the controlling further comprises terminating the supply of current to the electromagnet to decouple the first and second connectors.

18. The method of claim 16, wherein the magnetic element is selected from the group consisting of an electromagnet, a permanent magnet, and a ferromagnetic material.

* * * * *